United States Patent [19]

Beck et al.

[11] 4,285,833
[45] Aug. 25, 1981

[54] CATALYST, ITS PRODUCTION AND A PROCESS FOR THE POLYMERIZATION OF BUTADIENE

[75] Inventors: Manfred Beck, Odenthal; Gottfried Pampus, Leverkusen, both of Fed. Rep. of Germany

[73] Assignee: Bayer Aktiengesellschaft, Fed. Rep. of Germany

[21] Appl. No.: 131,679

[22] Filed: Mar. 19, 1980

[30] Foreign Application Priority Data

Mar. 22, 1979 [DE] Fed. Rep. of Germany ....... 2911262

[51] Int. Cl.$^3$ ............................................... C08F 4/70
[52] U.S. Cl. .............................. 252/428; 252/429 B; 252/431 C; 252/431 P; 526/139
[58] Field of Search ............ 252/429 B, 431 C, 431 P, 252/428

[56] References Cited

U.S. PATENT DOCUMENTS

| | | | |
|---|---|---|---|
| 3,804,870 | 4/1974 | Hughes et al. | 252/429 B X |
| 3,882,094 | 5/1975 | Halasa et al. | 252/429 B X |
| 3,966,697 | 6/1976 | Kampf et al. | 252/429 B X |
| 3,983,183 | 9/1976 | Kampf | 252/429 B X |

*Primary Examiner*—Patrick Garvin
*Attorney, Agent, or Firm*—Connolly and Hutz

[57] ABSTRACT

A catalyst consisting of (a) a cobalt compound, (b) an aluminium organic compound, (c) water and (d) a phosphite, characterized in that the phosphite is a compound corresponding to the formula (1):

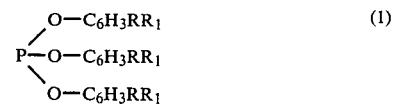

in which
R represents a $C_3$–$C_{20}$ alkyl radical, and
$R_1$ represents hydrogen or a $C_1$–$C_6$ alkyl radical.

Said catalyst can be used for polymerizing butadiene.

5 Claims, No Drawings

CATALYST, ITS PRODUCTION AND A PROCESS FOR THE POLYMERIZATION OF BUTADIENE

This invention relates to a multi-component catalyst consisting of a cobalt compound, an organo aluminium compound, water and a phosphite, a process for producing it by the reaction of the catalyst components in any sequence and a process for the polymerisation of butadiene.

Ziegler catalysts based on cobalt salts and certain organic phosphorous acid esters as well as their use in the polymerisation of butadiene are known. German Offenlegungsschrift No. 2,361,782 describes the production of low molecular weight liquid polybutadiene by using such a catalyst system. The preferred catalyst component, triphenyl phosphite, yields an oil having a medium vinyl content.

According to German Offenlegungsschrift No. 2,447,203, polybutadienes having a high vinyl content and high viscosity can be produced if tris-(o-phenylphenyl-) phosphites or trisnaphthyl phosphites are added to the same catalyst system. These catalyst systems yield vinyl contents of from 40 to 60 weight % under favourable conditions.

The polybutadiene produced using cobalt catalysts without the addition of co-catalysts has only a low vinyl content of about 1 weight %. This vinyl content is too low for some applications. Thus, the production of impact-resistant polystyrene by the addition of polybutadiene demands a vinyl content of about 2.5–17 weight %. A polybutadiene rubber (known as Li-BR) which has been produced using lithium butyl as catalyst is used, at present, for this type of application. This Li-BR is distinguished by a vinyl content of about 10 to 12 weight %. However, Li-BR has a different molecular structure from polybutadiene which has been produced using cobalt catalysts (Co-BR). Li-BR is virtually unbranched. Solutions of these rubbers, for example in styrene, of the type used for the production of impact-resistant polystyrene, exhibit higher viscosities than those produced from rubbers having the same molecular weight but a branched molecular structure.

In contrast to Li-BR, Co-BR is a branched rubber. Its solutions therefore have lower viscosities than Li-BR solutions, and higher molecular weight products can be used to achieve the same solutions viscosities.

There is, therefore, a need in the art to prepare Co-BR which has approximately the same vinyl contents as a Li-BR and a Mooney viscosity ML 4' (100° C.) of from 20 to 60.

It has accordingly been found that such Co-BR can be produced if alkyl-substituted triphenyl phosphites are used as a catalyst component.

The invention thus provides a catalyst consisting of (a) a cobalt compound, (b) an aluminium organic compound, (c) water and (d) a phosphite, characterised in that the phosphite is a compound corresponding to the formula (1):

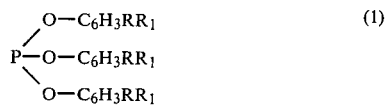

(1)

in which

R represents a $C_3$–$C_{20}$, preferably $C_8$–$C_{16}$ alkyl radical, and $R_1$ represents hydrogen or a $C_1$–$C_6$ alkyl radical, preferably hydrogen.

The radicals R and $R_1$ located on the various phenyl radicals can be the same or different from each other.

Organic and inorganic compounds of cobalt with suitable acids can be used as the cobalt compounds, for example, cobalt halides such as cobalt chloride, cobalt bromide, cobalt iodide or cobalt fluoride, cobalt sulphate, nitrate, carbonate or phosphate, and also cobalt acetate, cobalt propionate, valerate, octanoate, stearate or naphthenate, cobalt acetyl acetonate or dicyclopentadienyl cobalt. Cobalt naphthenate and cobalt octanoate are preferred.

Suitable aluminium organic compounds include dialkyl aluminium halides, for example $Et_2AlCl$, $i\text{-}Bu_2AlCl$, $Et_2AlBr$, $i\text{-}Bu_2AlBr$ or alkyl aluminium sesquichlorides, for example $Et_3Al_2Cl_3$. $Et_2AlCl$ is preferred.

Suitable phosphites corresponding to the formula (1) include: trisnonylphenyl phosphite, butylphenyl-dinonylphenyl phosphite and dibutylphenyl-nonylphenyl phosphite.

These compounds are known from the literature.

The molar ratio of the cobalt compound catalyst component to the aluminium organic compound can be from 1:5 to 1:1000, preferably from 1:20 to 1:100. The molar ratio of the cobalt component to water can amount to from 1:0.5 to 1:1000, a range of from 1:1 to 1:500 being preferred. The molar ratio of the cobalt compound to the phosphite can be from 1:0.01 to 1:10, but ratios of from 1:0.2 to 1:2.0 are preferred.

The invention also provides a process for the production of the catalyst, which is characterised in that the catalyst components (a) to (d) are reacted with each other in any sequence at temperatures between −70° and +80° C., preferably between −20° and +40° C., and in particular between +10° and +30° C.

The components are preferably introduced in the following order:

(1) aluminium organic compound, (2) water, (3) cobalt compound and (4) phosphite.

The catalyst may be produced in conventional inert solvents such as aliphatic, cycloaliphatic and/or aromatic hydrocarbons. Production can be effected batchwise or continuously.

If the catalyst is used during the polymerisation of butadiene, it would seem appropriate to use the same solvent for producing it as the solvent used during polymerisation. Moreover, if butadiene is polymerised, it is not necessary for the catalyst to have been preformed. The catalyst components can be added individually or together in any sequence to the solvent/butadiene monomer mixture or in the sequence of (1) solvent, (2) catalyst components, (3) butadiene, or in the sequence of (1) solvent, (2) some catalyst components, (3) butadiene, (4) remainder of catalyst components. It is also possible to add the solvent in several portions during the individual feed stages.

The invention also provides a process for the polymerisation of butadiene in solution, which is characterised in that the catalyst system according to the invention is used as catalyst. A polybutadiene having a vinyl content of from 2.5–17% and a viscosity in the Mooney range ML 4' (100° C.) of from 20 to 70 is obtained in this way.

Polymerisation is carried out in batches or continuously as solution polymerisation. Inert hydrocarbons such as, for example, hexane, cyclohexane, benzene and toluene are used as solvents. Benzene and cyclohexane are preferred.

The process is generally carried out at temperatures of from 0° to 100° C., preferably between 10° and 60° C.

Upon completion of polymerisation, the reaction is stopped in a known manner using H-acid compounds, and the mixture is stabilized and preferably worked up by treatment with hot water plus steam.

The catalyst is added in quantities which are familiar to the skilled man. The catalyst is preferably added in sufficient quantities for the quantities of cobalt compounds to be from 0.01 to 0.5 mmol per 100 g of monomer to be polymerised. The molar ratio of aluminium compounds to cobalt compounds can be from 1000:1 to 5:1, but a ratio of from 100:1 to 20:1 is preferred.

The molar ratio of cobalt compounds to phosphorous compounds can vary from 10:1 to 0.01:1. Ratios of from 2:1 to 0.2:1 are preferred.

The molar ratio of water to the aluminium organic compound can be varied from 0.1:1 to 1.0:1, but a range of from 0.2:1 to 0.5:1 is preferred.

The polybutadiene produced in this way is preferably suitable for the production of impact-resistant polystyrene, as well as for the production of commercial rubber articles. It can also be used as tyre rubber.

The invention is illustrated in more detail in the following Examples. Comparison tests show that the aliphatic and araliphatic phosphites which can be used as a catalyst component according to German Offenlegungsschrift No. 2,361,782 only yield polybutadiene having low vinyl contents.

Although the naphthyl phosphites used according to German Offenlegungsschrift No. 2,447,203 produce products with the highest vinyl contents, they do not produce rubbers but rather resins or oils. Comparison of the individual, named types of phosphite under the same reaction conditions and with the same catalyst composition shows that the vinyl contents of the products increase as the aromatic content in the phosphite increases while, conversely, the viscosity decreases. The following Table shows the interrelationship:

| Phosphite | Yield | Polymer viscosity | Vinyl content |
|---|---|---|---|
| Octyl | very good | too high | 2 |
| Benzyl | very good | too high | 2 |
| Nonylphenyl | good | suitable | 16 |
| Phenyl | poor | too low | 25 |
| Naphthyl | poor | too low | 43 |

In various tested recipes, nonylphenyl phosphite was found to be superior to naphthyl phosphite. Better yields and invariably rubber-like products are obtained in the vinyl range of from 2.5–17, whereas, although naphthyl phosphites yield some higher vinyl contents, they mainly yield products whose viscosity is too low.

The percentages in the following Examples are by weight.

EXAMPLE 1

1100 ml of dry benzene and 180 g of butadiene were placed, in the order indicated, in a 2-liter glass autoclave in the absence of oxygen and moisture. Some Al(C$_2$H$_5$)$_2$Cl was then added (4.06 mmol per 100 g of monomer), then water (H$_2$O: Al=0.284, molar) and cobalt naphthenate (0.058 mmol/100 g of monomer). The phosphite indicated in the Table was added as the last component (molar ratio P:Co=1.0). Polymerisation was started at 20° C. and increased step-wise by 10° C. hourly. After 4 hours running time, polymerisation was interrupted by the addition of stearic acid (0.8%) and 0.3% of BKF stabilizer [2,2-methylene-bis-(4-methyl-6-tert.butyl-phenol)] and the rubber was precipitated by allowing the solution to run into four times the weight quantity of ethanol. After separation of the precipitating agent, the mixture was dried for 14 hours under vacuum at 70° C. The results obtained with various phosphorous acid esters are compiled in Table 1.

TABLE 1
Influence of phosphites on butadiene polymerisation

| Phosphite | Conversion after 1 | 2 | 3 | 4 hours | ML 4' (100° C.) | 1,2-content (%) | L value[3] |
|---|---|---|---|---|---|---|---|
| Trioctyl | 82 | 97 | 98 | 98 | 200 | 2.4 | 7.49 |
| Tribenzyl | 76 | 88 | 90 | 93 | 200 | 2.1 | 9.51 |
| Trisnonylphenyl | 50 | 57 | 60 | 63 | 26 | 16.3 | 1.90 |
| Triphenyl | 13 | 30 | 38 | 44 | —[1] | 25.2 | 0.61 |
| Tri-1-naphthyl[2] | 29 | 34 | 38 | 39 | —[1] | 42.6 | 0.79 |

[1] Ml 4' value not measurable as too soft and tacky
[2] Melting point 90° C.; P = 6.70% (found); 6.73 (calculated)
[3] $\eta sp/c$ for c = 5 g per liter in toluene at 25° C.

The results show that, in comparison, aliphatic and araliphatic phosphites are unsuitable for the production of polybutadiene with vinyl contents of from 2.5–17 weight %. On the other hand, purely aromatic phosphites yield products having high vinyl contents, but are not rubber-like. Only the alkylsubstituted triphenyl phosphite assumes a middle position. Products in the desired vinyl range having rubber properties are obtained. It can generally be said that an increase in the vinyl (1,2) contents and a drastic reduction in the molecular weights take place as the substitution by aromatic radicals increases.

EXAMPLE 2

This Example illustrates the superiority of trisnonylphenyl phosphite (NPP) over the known tri-1-naphthyl phosphite (NP). In accordance with Example 1, polymerisation mixtures having equal molar quantities of the P-compounds are made from the following components in the given sequence and quantities: benzene (1100 ml), butadiene (180 g), 800 ppm of 1,2-butadiene based on 1,3-butadiene, Co-naphthenate (0.058 mmol/100 g of monomer), water (H$_2$O:Al=0.46), phosphorous acid ester (Co:P=0.7), Al(C$_2$H$_5$)$_2$Cl (2.6 mmol/100 g monomer). The results are compiled in Table 2.

TABLE 2
Comparison of the effectiveness of NPP and NP

| | Phosphite | Conversion after 1 | 2 | 3 | 4 hrs. | Ml 4' (100° C.) | L-value[1] | 1,2-content (%) |
|---|---|---|---|---|---|---|---|---|
| A | trisnonyl phenyl | 71 | 82 | 85 | 87 | 50 | 2.69 | 6.9 |
| B | tri-1-naphthyl | 27 | 33 | — | 40 | viscous | 0.56 | 17.7 |

[1] cf. [3] in Table 1

Comparison of the viscosities of the two products proves the advantage of NPP, apart from the conversion. Product A is a rubber which is suitable for the production of impactresistant polystyrene, while B is unusable for this purpose.

EXAMPLE 3

In this Example, the two phosphites from Example 2 are compared in a different polymerisation recipe. The following changes were made: 1,2-butadiene (1000 ppm), Co-naphthenate (0.08 mmol per 100 g of monomer), water ($H_2O:Al=0.46$), phosphite ($Co:P=1.0$) and $Al(C_2H_5)_2Cl$ (4.2 mmol per 100 g of monomer).

TABLE 3

| Phosphite | | Conversion after 1 | 2 | 3 | 4 hrs. | ML-4' (100° C.) | 1,2-content (%) | L value |
|---|---|---|---|---|---|---|---|---|
| A | trisnonyl-phenyl | 77 | 85 | 86 | 88 | 38 | 8.2 | |
| B | trisnonyl-phenyl | 64 | 75 | 80 | 82 | 45 | 12.1 | |
| C | tri-1-naphthyl | 19 | 33 | — | 43 | viscous | 31.6 | 0.14 |
| D | tri-1-naphthyl | 30 | 40 | 46 | 47 | viscous | 43.6 | |

The superiority of NPP (Tests A,B) over NP (Tests C,D) is also proven in this recipe.

EXAMPLE 4

As already demonstrated in Examples 1 to 3, the variation in the order of the catalyst constituents never affects the results adversely. In the following Example, the Al-component is added first (in contrast to Examples 2 and 3). A rubber having a 1,2-content in the desired range is also obtained.

The following components are used: benzene (1100 ml), butadiene (180 g), 1,2-butadiene (1200 ppm, based on 1,3-butadiene), $Al(C_2H_5)_2Cl$ (4.5 mmol per 100 g of monomer), water ($H_2O:Al=1.45$), Co-naphthenate (0.058 mmol per 100 g of monomer), trisnonylphenyl phosphite ($Co:P=1.0$). The mixture is worked up in the manner described after 4 hours. 148 g of rubber (82%) having an ML-4' value of 38 and a 1,2-content of 9.4%, cis 88.7%, trans 1.9%, are obtained.

EXAMPLE 5

The use of a preformed catalyst is described in this Example. The catalyst components are added in the sequence indicated to 1100 ml of dry benzene:
1. $AlEt_2Cl$ (4.04 mmol per 100 g of monomer, 30.3 ml of 0.24 M solution),
2. water ($H_2O:Al=0.27$; 1.09 mmol per 100 g of monomer),
3. cobalt octoate (0.058 mmol per 100 g of monomer, 10.4 ml of 0.01 M Co-solution,
4. trisnonylphenyl phosphite ($Co:P=1.0$; 10.4 ml of 0.01 M solution).

180 g of butadiene containing 800 ppm of 1,2-butadiene are subsequently added. The reaction commences after a few minutes. The conversion is 66% after 1 hour at 30° C. The temperature is allowed to rise to 50° C. and the reaction is stopped after 4 hours.

Yield 81%

Mooney value ML 4' (100° C.) 31. Vinyl content 5.9%

EXAMPLE 6

A: Similar to Example 5 but with the following changes: 400 ppm of 1,2-butadiene in the monomer.

B: Similar to Example 5 with the following changes: molar ratio $H_2O:Al=0.315$, $AlEt_2Cl$ (3.48 mmol per 100 g of monomer).

| Results | Conversion (%) 1 | 2 | 4 hrs. | ML 4' (100° C.) | 1,2 | cis-1,4 | trans-1,4 |
|---|---|---|---|---|---|---|---|
| A | 74.0 | 79.5 | 83.0 | 55 | 5.8 | 92.1 | 2.1 |
| B | 73.0 | 80.0 | 83.5 | 62 | 6.6 | 91.7 | 1.7 |

EXAMPLE 7

This Example demonstrates the suitability of cycloaliphatic solvents. 180 g of butadiene are added to 1280 ml of dry cyclohexane. The catalyst constituents are added in the sequence indicated (quantities in brackets): 1. cobalt octoate (14.4 ml of 0.01 M solution in cyclohexane); 2. water (molar ratio $H_2O:Al=0.74$); 3. trisnonylphenyl phosphite (7.2 ml of 0.01 M solution; $Co:P=0.5$); 4. $AlEt_2Cl$ (45 ml of 0.24 M solution in cyclohexane).

Starting temperature: 20°. The temperature is raised to 50° over 1.5 hours and the mixture is left to react for 4 hours. The final conversion is 77%.

ML 4' (100) = 76; 1,2-content 13.1%.

We claim:

1. A catalyst consisting of (a) a cobalt compound, (b) an aluminium organic compound, (c) water and (d) a phosphite, characterised in that the phosphite is a compound corresponding to the formula (1):

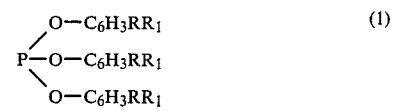

in which

R represents a $C_3-C_{20}$ alkyl radical, and $R_1$ represents hydrogen or a $C_1-C_6$ alkyl radical.

2. A catalyst according to claim 1, characterised in that the molar ratio of (a) to (b) is from 1:5 to 1:1000, the molar ratio of (a) to (c) is from 1:0.5 to 1:1000 and the molar ratio of (a) to (d) is from 1:0.01 to 1:10.

3. A catalyst according to claim 1, characterised in that the molar ratio of (a) to (b) is from 1:20 to 1:100, the molar ratio of (a) to (c) is from 1:1 to 1:500 and the molar ratio of (a) to (d) is from 1:0.2 to 1:2.0.

4. A process for the production of the catalyst according to any one of claims 1 to 3, characterised in that the catalyst components (a) to (d) are mixed together in any sequence at temperatures of between −70° and +80° C.

5. A process according to claim 4, characterised in that the catalyst components are reacted with each other in the sequence (b), (c), (a), (d).

* * * * *